US012761384B1

(12) United States Patent
Duncan et al.

(10) Patent No.: US 12,761,384 B1
(45) Date of Patent: Oct. 13, 2026

(54) PASSIVE SEISMIC MONITORING TO DETECT ONSET OF GROUND FAILURE HAZARD

(71) Applicant: Microseismic, Inc., Houston, TX (US)

(72) Inventors: Peter M. Duncan, Bellaire, TX (US); Michael Thornton, Houston, TX (US)

(73) Assignee: Microseismic, Inc.

( * ) Notice: Subject to any disclaimer, the term of this patent is extended or adjusted under 35 U.S.C. 154(b) by 637 days.

(21) Appl. No.: 18/158,938

(22) Filed: Jan. 24, 2023

(51) Int. Cl.
*G01V 1/28* (2006.01)

(52) U.S. Cl.
CPC ........ *G01V 1/288* (2013.01); *G01V 2210/123* (2013.01); *G01V 2210/65* (2013.01)

(58) Field of Classification Search
CPC .......................... G01V 1/288; G01V 2210/123
See application file for complete search history.

(56) References Cited

U.S. PATENT DOCUMENTS

2015/0226868 A1* 8/2015 Cieplicki .............. G01V 1/307 702/14
2015/0285933 A1* 10/2015 Grealy .................. G01V 1/288 367/7
2019/0302291 A1* 10/2019 Lolla ...................... G01V 1/288
2020/0110185 A1* 4/2020 Xu ......................... G01V 1/181

FOREIGN PATENT DOCUMENTS

CN 105572732 A1 * 5/2016

* cited by examiner

*Primary Examiner* — Catherine T. Rastovski
*Assistant Examiner* — Sharad Timilsina
(74) *Attorney, Agent, or Firm* — Richard A. Fagin

(57) ABSTRACT

A method for monitoring Earth's subsurface for indication of ground failure includes processing signals detected by seismic sensors disposed proximate the area, by migrating a response of the sensors to each of a plurality of sub volumes. The migrated responses are summed over a first selected time interval. Events having amplitude exceeding an average amplitude over a second selected time interval longer than the first time interval are detected and their amplitudes are summed from within each of a plurality of substantially vertical column of the plurality of sub volumes. A two dimensional smooth surface is calculated based on the summed amplitudes, and a difference between the summed amplitudes and a value of the smoothed surface for each vertical column is calculated. A statistical measure of the difference values is calculated. Statistical measures that exceed a selected threshold are identified as advance indication of ground failure.

16 Claims, 11 Drawing Sheets

PASSIVE SEISMIC MONITORING TO DETECT ONSET OF GROUND FAILURE HAZARD

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of passive monitoring of seismic events in the Earth's subsurface. More particularly, the disclosure relates to methods for passive monitoring to detect onset of possible ground failure sufficiently in advance of such failure to enable remedial action.

Passive seismic monitoring includes deploying seismic sensors in a selected pattern on the ground surface and/or in holes drilled to selected depths below the surface. Seismic energy detected by the seismic sensors may be processed to determine, among other things, occurrences of subsurface formation rupture (fracturing, faulting) and progression of such rupturing over time. U.S. Pat. No. 7,663,970 issued to Duncan et al. describes methods for processing passive seismic signals in order to determine locations of and times of occurrence (hypocenters) of seismic events (e.g., movement on fractures and faults) in the Earth's subsurface. Other techniques related to that disclosed in the '970 patent include those disclosed in U.S. Pat. No. 8,218,394 issued to Liang et al., U.S. Pat. No. 8,902,710 issued to Williams-Stroud et al. and U.S. Pat. No. 10,036,819 issued to Eisner et al.

Such passive seismic monitoring techniques have been used in particular for monitoring progress of hydraulic fracturing treatments in connection with the production of oil and gas from subsurface formations.

More recently, there has been interest expressed in the use of passive seismic monitoring to detect onset of subsurface formation movement in order to mitigate the risk of ground failure, e.g., surface collapse, and associated damage to and/or loss of property and environmental hazards. In particular applications for such techniques, for example, surface storage of hazardous materials, power generating plants, hospitals and aircraft runways, facilities on the ground surface may be susceptible to the risk of ground failure enabling the hazardous materials to enter ground water and/or be uncontrollably released on the surface.

Passive seismic monitoring techniques known in the art, although used for detecting subsurface hazards such as mine collapse, have not been successfully used for ground surface failure, e.g., sinkhole or karst development, risk avoidance, at least in part because of the small seismic moment of individual subsurface events, wherein such events cumulatively over an extended time period may result in ground surface failure. Accordingly, there is a need for ground fault monitoring techniques that can detect such small moment events over time to warn of increased hazard of ground failure.

SUMMARY

One aspect of the present disclosure is a method for advance detection of possible ground failure using passive seismic signals. A method according to this aspect includes accepting as input to a computer recorded signals detected by a plurality of seismic sensors disposed proximate the area. In the computer, a response of the plurality of seismic sensors is migrated to each of a plurality of sub volumes within the area. In the computer, the migrated response for each of the plurality of sub volumes is summed over a first selected time interval. In the computer, events in the summed, migrated response having an amplitude exceeding, by a predetermined amount, an average amplitude over a second selected time interval longer than the first time interval are detected. In the computer, amplitudes of the detected events over a third time interval are summed for each of a plurality of substantially vertical columns of the plurality of sub volumes. In the computer, a two dimensional smooth surface based on the summed amplitudes prior to smoothing is calculated for each time interval. In the computer the two dimensional surfaces are smoothed with a time operator of a specified (but adjustable) length. In the computer, a difference between the summed amplitudes and a value of the two dimensional smoothed surface for each vertical column is calculated for each time interval. In the computer, a statistical measure of each the difference values is calculated and statistical measures that exceed a selected threshold are identified as advance indication of ground failure.

In another aspect, a computer program stored in a non-transitory computer readable medium includes logic operable to cause a programmable computer to perform actions comprising the actions of the method set forth in the previous aspect.

In some embodiments, the detected seismic signals comprise at least one of particle motion signals, pressure signals and pressure time derivative signals.

In some embodiments, the statistical measure comprises Z score, the Z score comprising a ratio of the difference value with respect to a standard deviation of the difference values.

In some embodiments, the migrating is defined with respect to a horizontal grid of sub-areas within the area.

In some embodiments, the columns are each defined with respect to each sub-area.

In some embodiments, the migrating comprises adding a time delay to the each of recorded signals such that a seismic event originating in each sub-volume would occur in each of the recorded signals at a same time.

In some embodiments, the time delay is calculated based on a spatial distribution of seismic velocity in the area and a location of each of the seismic sensors.

In some embodiments, the predetermined amount comprises a selected multiplier.

Other aspects and possible advantages will be apparent from the description and claims that follow.

DETAILED DESCRIPTION

The present disclosure is made with reference to a surface hazardous material storage facility. In particular, the present disclosure is made with reference to production of phosphate fertilizer, wherein waste products include phosphogypsum and acid. The phosphogypsum is disposed on the ground surface in a "stack", which is a generally pyramid-shaped pile, underlain by an impermeable barrier such as high density polyethylene. A depression formed in the top of the gypsum stack may serve as a liquid reservoir for acid used in the fertilizer production process. It is to be clearly understood that methods according to the present disclosure are in no way limited to use with such facilities; the present example embodiment is only to illustrate an example implementation of methods according to the present disclosure, which may be used in connection with any feature or structure subject to ground failure hazard.

Figure 1:
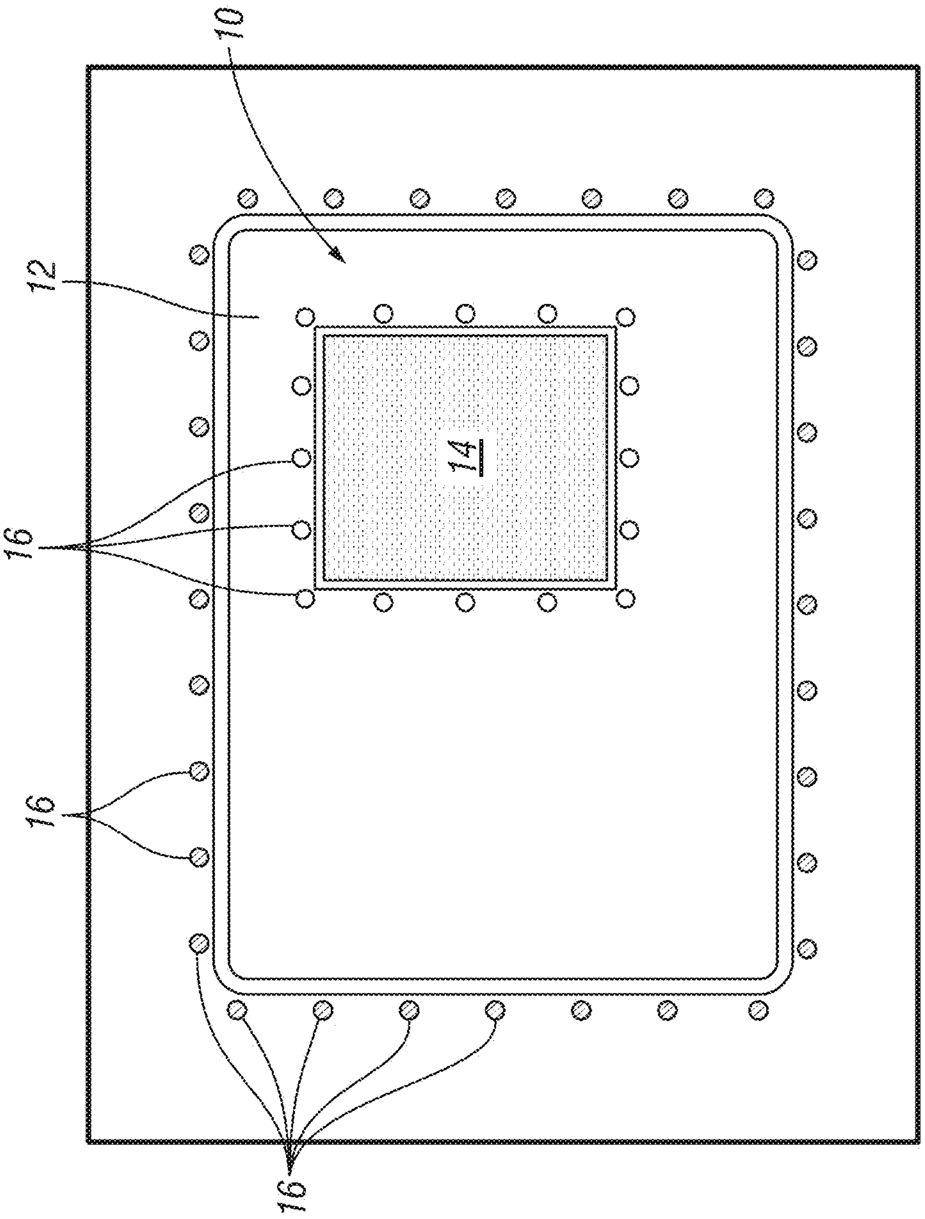
FIG. 1 shows a plan view of a surface facility requiring ground monitoring and example placements of seismic sensors according to the present disclosure.

FIG. 1 shows an example of a storage facility 10 disposed on the ground surface. The storage facility 10 may comprise a base of solid material 12, which may be, for example, gypsum produced as a waste product of phosphate fertilizer and phosphoric acid production process. The base of solid material 12 may comprise a reservoir 14, into which liquid waste, such as hydrofluoric acid may be disposed for storage and possible recycling. Seismic sensors 16 may be disposed at selected locations generally around the perimeter of an area of the subsurface to be monitored for possible ground fault hazard growth. Some of the seismic sensors 16 may be disposed around the perimeter of a perceived higher risk area of the surface facility 10, for example and without limitation the reservoir 14. The base of solid material 12 may be underlain by an impermeable barrier 12A, for example and without limitation a high density polyethylene membrane.

Placement of the seismic sensors 16 is a matter of discretion, however, in general, the seismic sensors may be arranged in a closed pattern at the outer boundary of where a possible ground failure needs to be detected in advance of such ground failure, in order to identify growing subsurface failures such as developing karsts at locations that put relevant portions of the surface facility 10 at risk. It is to be clearly understood that methods according to the present disclosure may use different arrangements of seismic sensors, provided that such sensors are able to detect passive seismic emissions from an area of the subsurface to be monitored.

Figure 2:
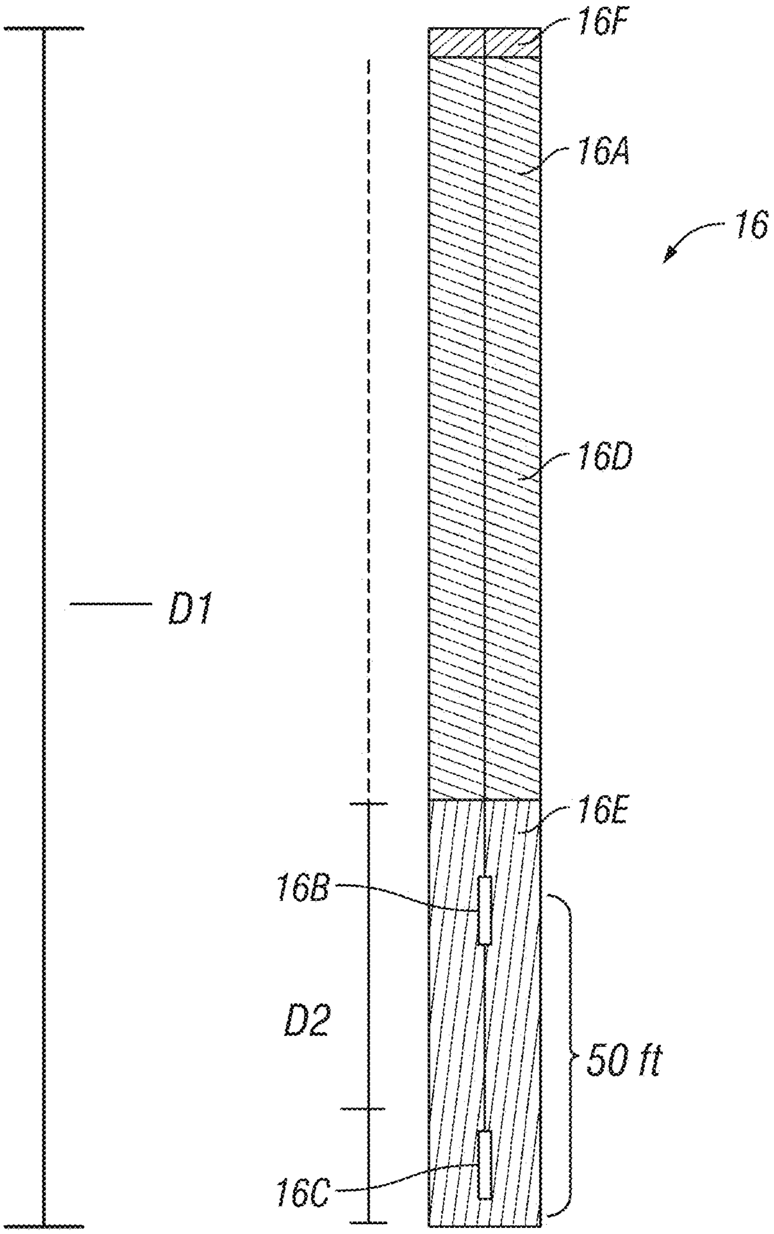
FIG. 2 shows an example of seismic sensors disposed in a drill hole at locations shown in FIG. 1.

FIG. 2 shows an example embodiment of seismic sensors 16 that may be used in accordance with the present disclosure. At selected locations, e.g., such as shown in FIG. 1 around the perimeter of a subsurface area to be monitored, a drill hole 16A may be bored to a selected depth D1 chosen to provide attenuation of acoustic noise originating at the surface. Seismic sensors 16B, 16C may be disposed in the drill hole 16A at spaced apart depths, e.g., at D1 and spaced above at D2. The sensors 16B, 16C may be permanently encased in cement 16E from the bottom of the drill hole 16A to a shallower depth, e.g., at D2. The drill hole 16A may be filled from the top of the cement to the surface with material such as bentonite 16D to improve attenuation of surface noise propagating into the drill hole 16A. The seismic sensors 16B, 16C may be any form of particle motion sensitive device, for example, geophones, accelerometers, jerk meters and the like, or pressure or pressure time derivative sensitive devices such as hydrophones if disposed in liquid (e.g., at the bottom of a body of water or if liquid is placed in the drill hold 16A) or any manner of optical sensing such as distributed acoustic sensors (DAS). In some embodiments, three component particle motion sensors (e.g., geophones) may be used. For purposes of defining the scope of the present disclosure, it is only necessary for the seismic sensors 16B, 16C to detect seismic energy at the disposed locations; the type of sensor itself and its exact placement are not limitations on the scope of the present disclosure. Signals detected by the seismic sensors 16B, 16C may be transmitted to and recorded at a data recording and processing unit disposed at any convenient location, for example and without limitation to be explained in more detail with reference to FIG. 12. For purposes of a method according to the present disclosure it is only necessary that a substantially continuous recording of all signals detected by the seismic sensors 16B, 16C be made at all the locations (16 in FIG. 1) at which the seismic sensors are disposed. Such recording will be processed to obtain indications of subsurface events as will be further explained below. While FIG. 2 shows two vertically spaced apart seismic sensors 16B, 16C, any number of spaced apart sensors may be used in accordance with the present disclosure; the number of sensors shown in FIG. 2 is not a limitation on the scope of the present disclosure.

Figure 3:
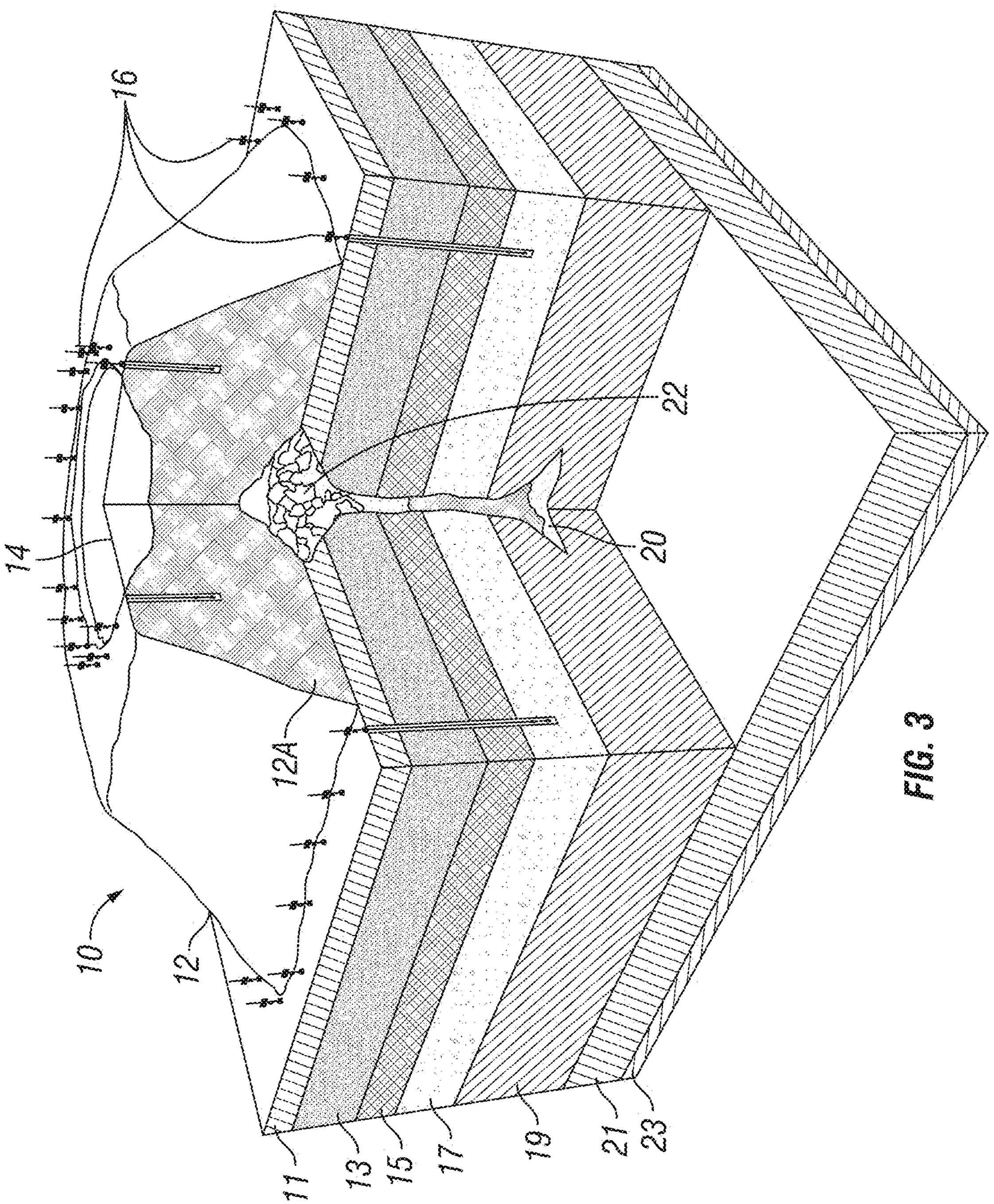
FIG. 3 is a cut away perspective view of the facility shown in FIG. 1.

FIG. 3 shows a cut away perspective view of the surface facility 10 to illustrate possible technical issues addressed by methods according to the present disclosure. The base of solid material 12 underlies the reservoir 14. The base of solid material is underlain by an impermeable barrier 12A such as high density polyethylene liner. A surface formation 11 may be formed into a retaining structure to hold the base of solid material 12. Various earthen formations 13, 15, 17, 19, 21 and 23 may be disposed in layers below the surface formation 11. One of the underlying formations, e.g., at 23, may comprise water soluble material, for example, limestone and/or dolomite. Movement of ground water over time may dissolve the underlying formation 23, such that cave like features or karsts 20 may form. Depending on the material composition and overburden stress profile of the formations 11, 13, 15, 17, 19 and 21 above the underlying formation 23, if the karst 20 grows to a certain size, the immediately overlying formation 21 may fail. Over time such failure may propagate upwardly through the formations 19 through 11, until the failure feature expresses as a funnel shaped feature 22 at the upper limit of the failure feature. In methods according to the present disclosure, small amplitude seismic events may be detected and isolated from background noise in the recorded seismic signals. When detected over a substantial period of time, such detected small amplitude seismic events may give indication of the failure feature propagating toward the surface and placing the surface facility 10 at risk. Methods according to the present disclosure may give such indication well before the upper limit of the failure feature (e.g., at 22) reaches a depth where the surface facility 10 is at risk, thus providing the operator of the surface facility 10 time to take remedial action. Such remedial action may comprise, by way of example and without limitation drilling a relief hole proximate or into the failure feature and pumping in a sealing material such as cement to stop further upward propagation of the failure feature.

Figure 4:
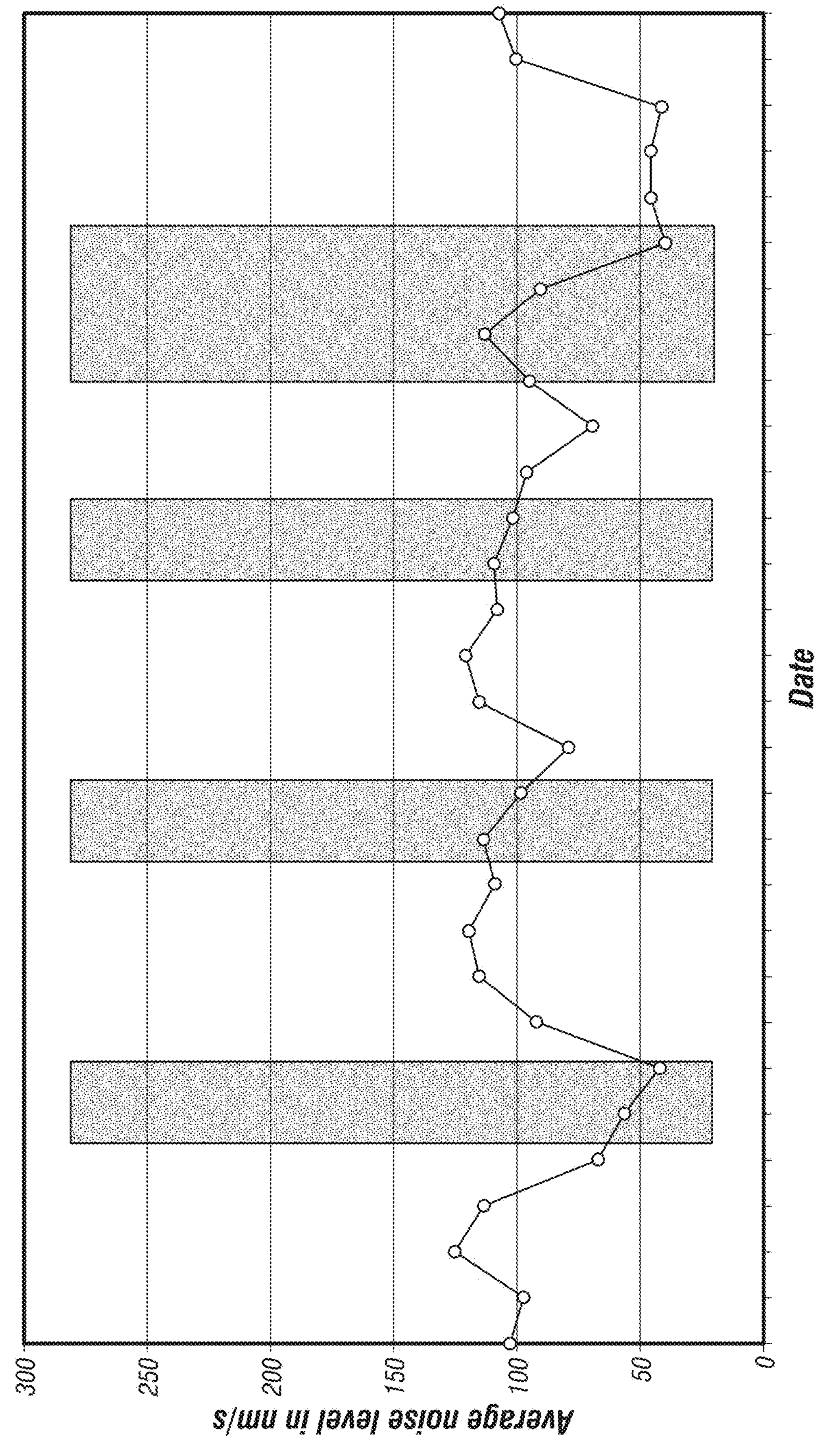
FIG. 4 shows a graph of seismic amplitude with respect to time to illustrate determining background noise according to the present disclosure.
Figure 5:
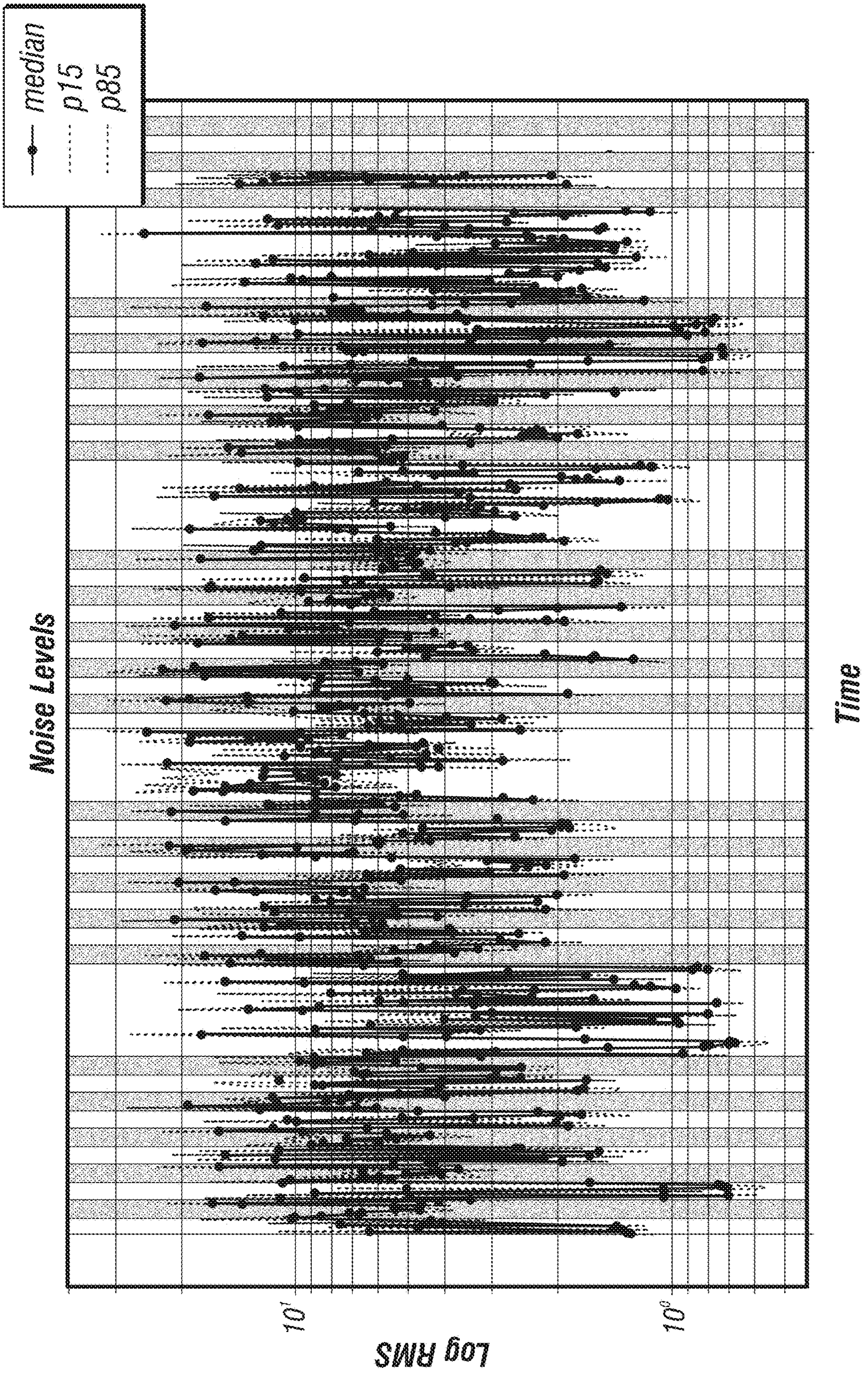
FIG. 5 shows a longer term graph of seismic amplitude.

During monitoring, failure feature growth may generate seismic events having moment magnitude within or below the range of ordinary ground noise at a facility. A graph showing measured noise level at a particular surface facility during ground monitoring is shown in FIG. 4. A larger scale graph of the same noise levels is shown in FIG. 5.

In order to determine occurrence of such low magnitude events in a high background noise environment, in a method according to the present disclosure, beam steering of the sensor response and statistical processing of the beam steered response may be used to identify locations in the subsurface exhibiting relatively large numbers of small moment magnitude events that while individually difficult to detect, when so processed can provide indication of a growing failure feature in the subsurface sufficiently in advance to give the facility operator time to take remedial action.

Figure 6:
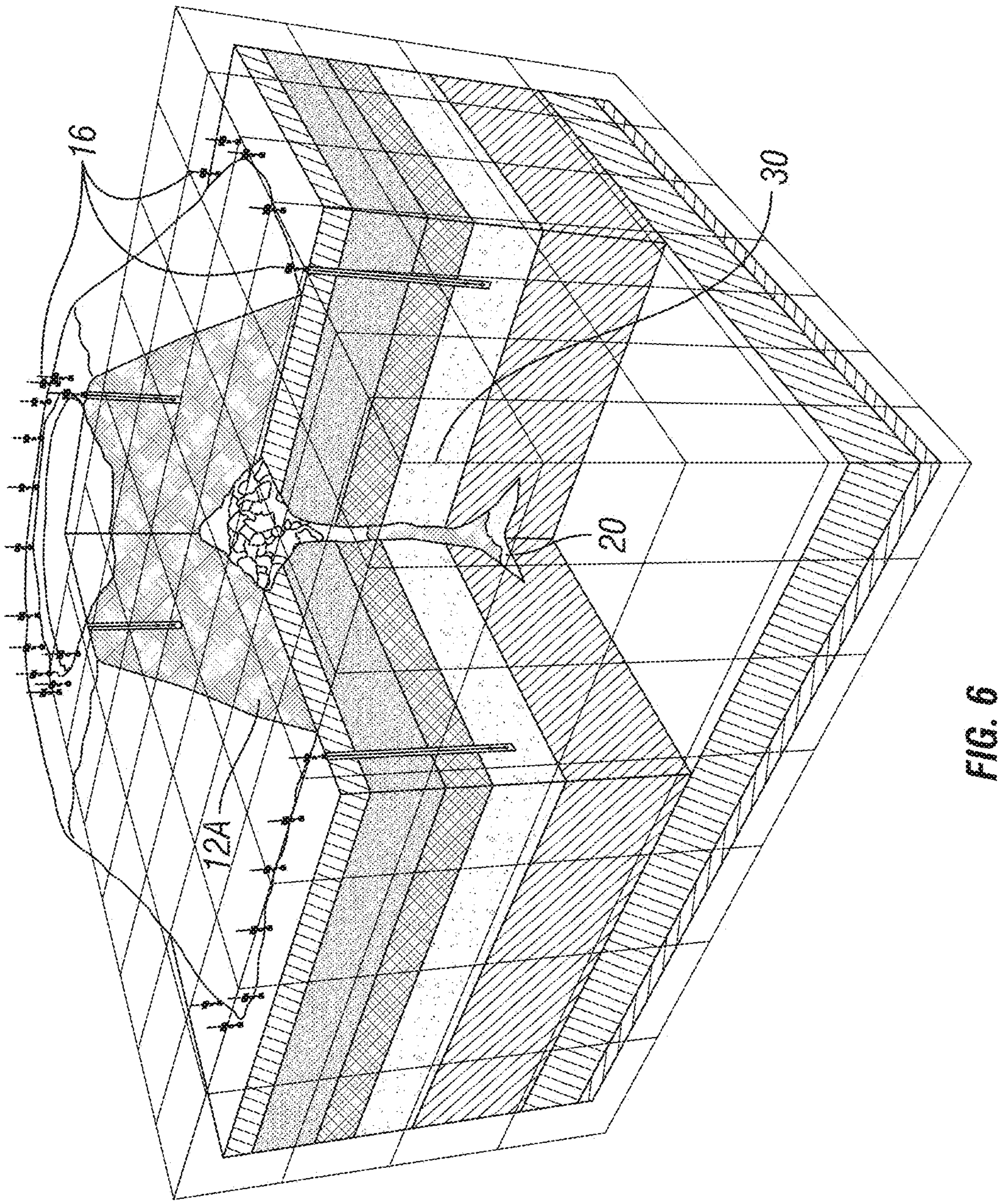
FIG. 6 shows a cut away perspective view as in FIG. 3, with a growing subsurface feature that can express at the surface as a sink hole. Also illustrated is the subdivision of the volume shown into a grid of vertical cells for processing according to the present disclosure.

In processing signals detected by the seismic sensors according to the present disclosure, first, a volume of the subsurface within the area being monitored (see FIG. 1) may be divided into suitable size grid elements or sub-volumes. Such sub-volumes may be defined, for example, by dividing the area (FIG. 1) into, for example, a regularly spaced grid, such as a rectangular grid, with the vertical dimension divided into suitably sized depth increments. Dimensions of the grid elements horizontally and vertically may be chosen according to the spatial resolution of the arrangement of seismic sensors as shown in FIG. 1 and FIG. 2. An example of such a grid is shown in FIG. 6, in which individual grid cells, that is, the sub volumes, are shown by numeral 30.

The response of the seismic sensors (i.e., the detected seismic signals), see 16 in FIGS. 1 and 16B, 16C in FIG. 2, may be migrated to each of the foregoing sub-volumes 30, such that the migrated signals represent the sensor responses that would be obtained if seismic energy originated within each one of the foregoing sub-volumes 30. In some embodiments, migrating the signals may comprise beam steering. Beam steering may be performed, for example, by applying suitable time delay to the signals detected by each sensor such that a travel time of seismic energy from an event occurring at any selected point or sub-volume in the subsurface would arrive at each seismic sensor at a time corresponding to the distance from such selected point or sub-volume to each seismic sensor depending on the spatial distribution of seismic velocity in the subsurface. In methods according to the present disclosure, the seismic velocity distribution under a surface facility may be well known and as a result migration, e.g., beam steering, may be performed with reasonable accuracy by such migration process. It will be appreciated that by locating seismic sensors around the perimeter of the facility, beam steering to any point in a horizontal plane may be readily performed. Beam steering in the vertical dimension may be performed with only one sensor at each position such as shown in FIG. 1, provided that some of the sensors are disposed at different depths from each other, or are sensors that detect motion along more than one direction, e.g., three component geophones. However, it will also be appreciated that migration may have better vertical resolution if there are sensors disposed at more than one depth at some locations as shown in FIG. 2.

In migration according to the present disclosure, a travel time table may be calculated using a model of seismic velocity distribution within the target volume. The travel time table (based on a forward propagation model) represents the travel time that a seismic signal would take to get from any of the points in the target volume to each of the seismic sensors (16 in FIG. 1). The travel time for each point in the volume to each receiver is referred to as the moveout correction. The moveout correction is applied to the recorded signals from each seismic sensor to beam steer the seismic signal recordings to each point (or sub-volume) within the target volume. The beam steered signals represent seismic signals originating at that particular target point. The moveout corrected seismic signal recordings for all the seismic sensors (beam steered to a given target point or sub-volume) are then summed to provide an estimate of the seismic signals that would be recorded at that particular target volume point or sub-volume.

Figure 7:
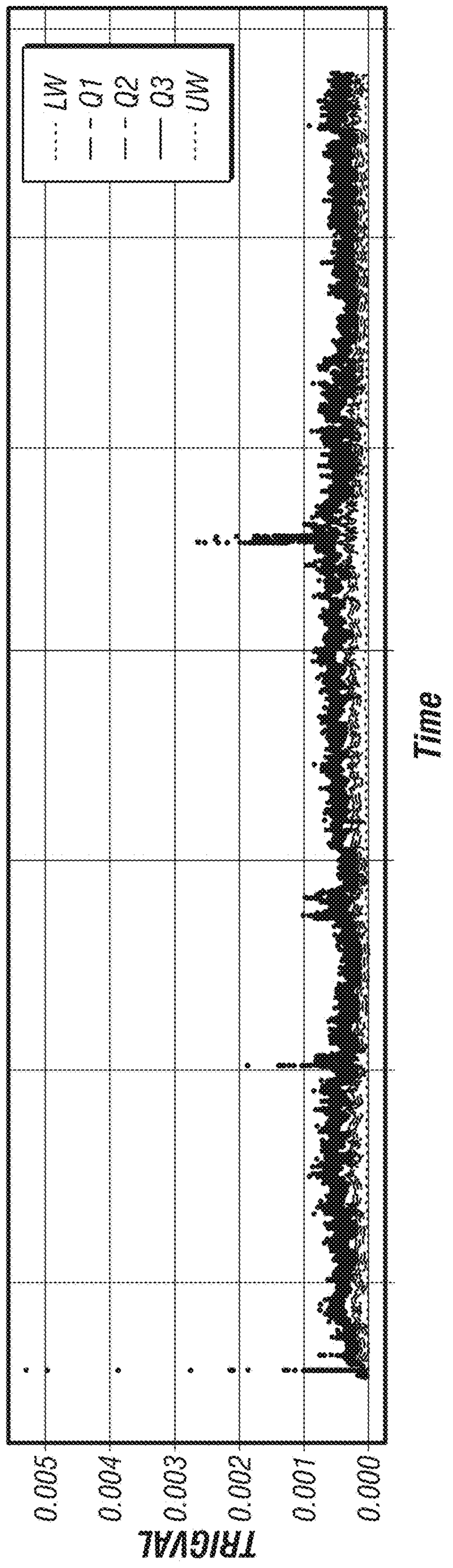
FIG. 7 shows a graph of seismic amplitude with respect to time indicating possible seismic events in the subsurface.

The migrated, (e.g., beam steered), summed seismic signals for each target volume point are then scanned for amplitude values that are anomalously large relative to a shifting ambient background noise level. Such anomalous amplitude values will be termed "triggers". One method for identifying "triggers" involves finding short time average amplitudes that exceed longer time average amplitudes from that target sub volume or point by a predetermined amount. In the present example embodiment, the predetermined amount may be a selected multiplier. The foregoing may be implemented, for example, as the amplitude average of a 20 millisecond length time window (as an example of short time amplitudes) divided by the amplitude average of a 200 millisecond length time window (as an example of long time amplitudes) centered on the same time sample. The foregoing ratio may be calculated for every time that is sampled within a predetermined length of signal recording. For each time sample at which the short term average amplitude exceeds the predetermined amount with respect to the long time average amplitude, such event is denoted in the record as a "trigger." The foregoing calculation is shown in graph form in FIG. 7. The method described will be recognized as a simple method for estimating the smoothed time derivative of the amplitude record at each point in time, for a given sub-volume. Taking the derivative would be another example of identifying "triggers". Those familiar with time series analysis will readily identify other common methods for isolating anomalous values that could be used as "triggers".

In some embodiments, once a time period in which one or more triggers have been identified, the seismic data in the period of time over which the trigger is determined (e.g., 1 hour) is interrogated and the amplitudes of all trigger events within that time period are summed to provide an estimate of the acoustic energy released during that time period. This estimation of total seismic energy release can be used as an approximate indicator of the mass wasting (mass of failed rock formation) that occurred in that period of time as the failure feature grows. Summing the amplitude of all triggers detected over much longer time periods, e.g., months or years, can similarly be used to assess the progress of the failure feature development by estimating rock formation failure mass with respect to time. An increase in the rate of acoustic energy emission is indicative of an acceleration in development of a failure feature and an increase in the hazard of catastrophic failure.

Figure 8A:
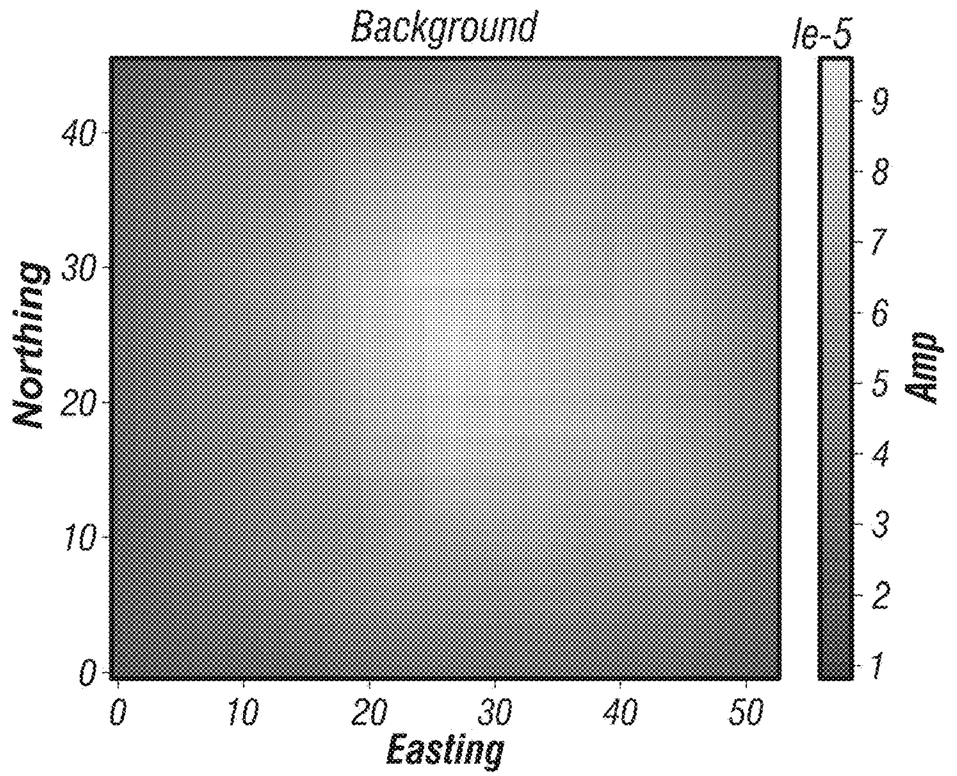
FIG. 8A shows a plan view of amplitude of summed amplitudes of events from FIG. 7 in each of the cells defined in FIG. 6.

The amplitudes of all the identified triggers are then summed over a selected time interval (e.g., 1 hour), and from within a selected substantially vertical dimension column, that is, all grid blocks below the horizontal coordinate grid location of the triggers. The foregoing is shown in graphic form in FIG. 8A to calculate a mean trigger amplitude value (STK) for that grid location, for the selected time interval. Corresponding STK values may be computed for the corresponding selected time interval for each other defined grid location in the subsurface area. STK values may be similarly calculated for any or all such grid locations within a plurality of other selected time intervals (which may be the same duration as the selected time interval) for any part of or all of the length of time within which seismic signals have been recorded.

Figure 8B:
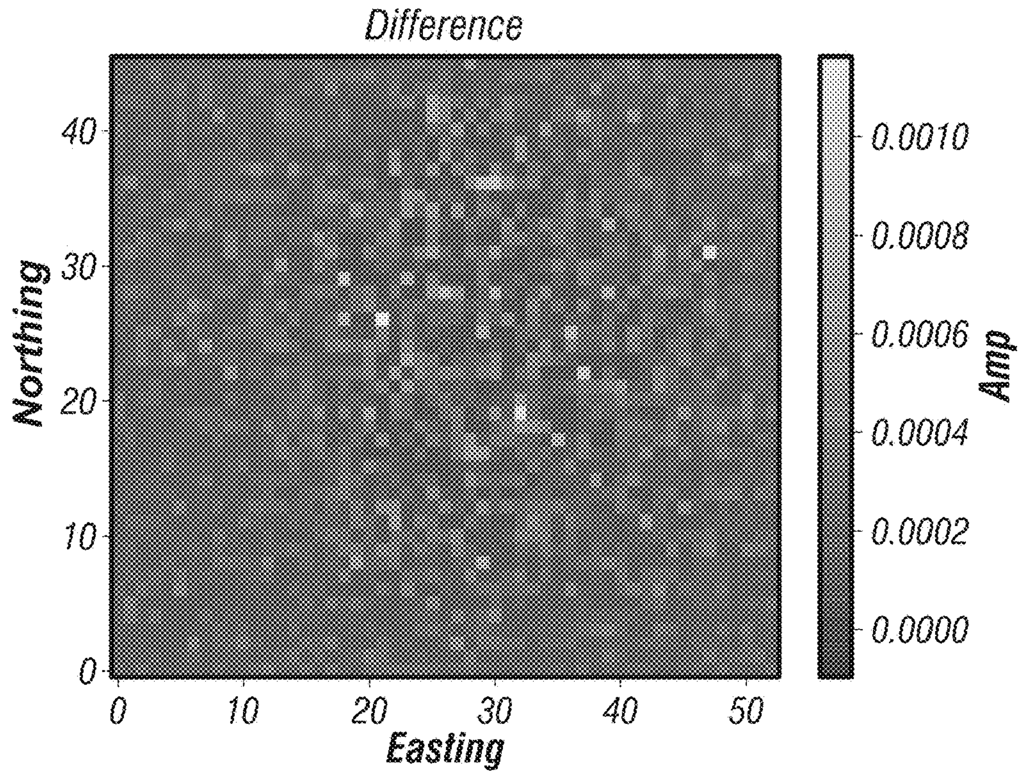
FIG. 8B shows a plan view of a smooth surface fitted to the summed amplitudes.

The STK values thus calculated are used to generate a smoothed 2 dimensional surface, e.g., using a grid smoothing algorithm that calculates a value, at each grid location, based on the average or a weighted average of all STK values within a predefined number of grid locations adjacent to the grid location for which the 2 dimensional surface value is to be calculated. Smoothing may also be performed with respect to time, for example, by calculating, for the selected time interval, an average or weighted average of the smoothed STK values of the selected time interval and a predetermined number of preceding and following time intervals. The foregoing is also shown in graphic form in FIG. 8B.

Figure 9A:
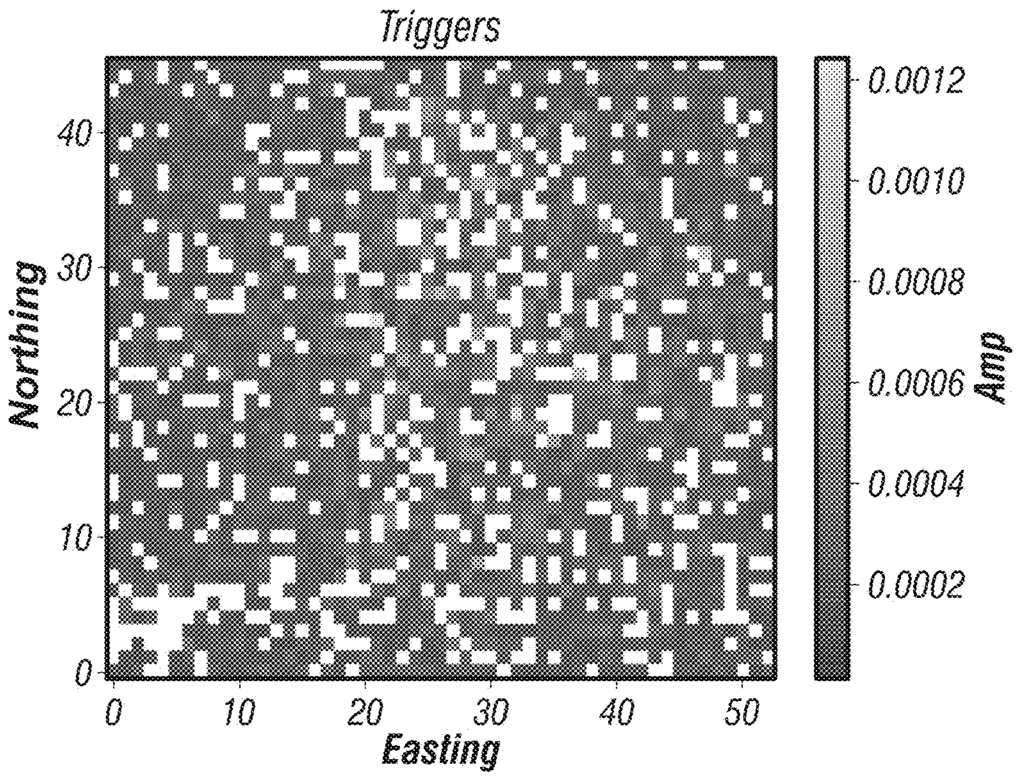
FIG. 9A shows a plan view of amplitudes of residual anomalies in each cell from the plots in FIG. 8.
Figure 9B:
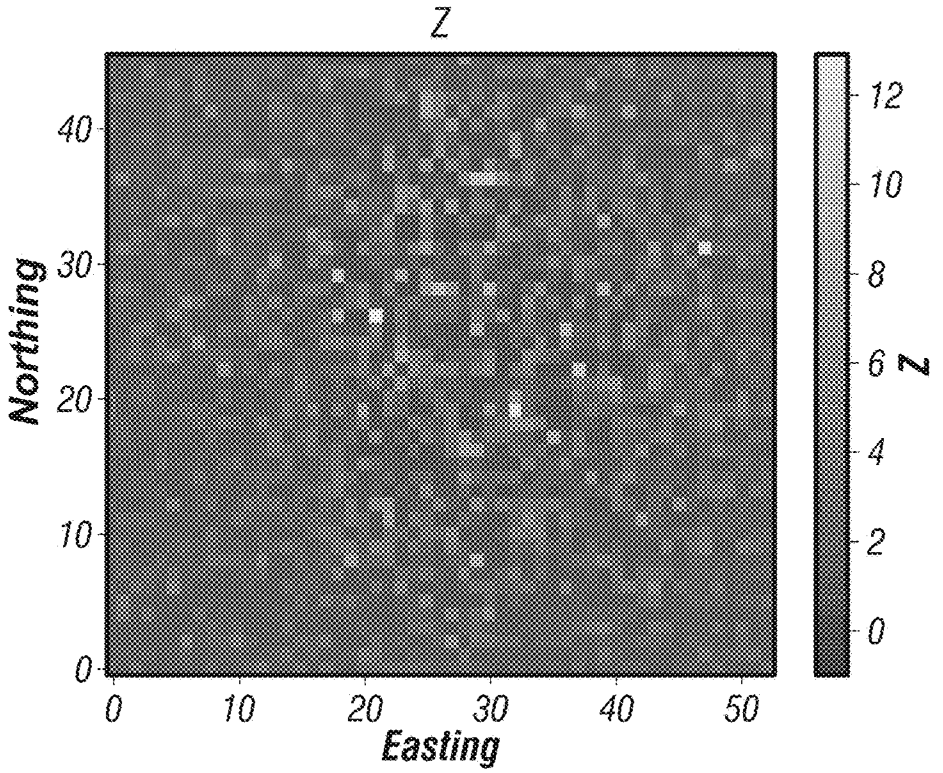
FIG. 9B shows a plan view of Z-scores of each residual anomaly in each cell from the residual amplitudes.

For each grid location, a difference between the STK value and the smoothed 2 dimensional surface value is then determined for each such predetermined time interval within part or all of the length of time within which seismic signals are recorded. The foregoing is shown in graphic form in FIG. 9A. The difference values may then be used to calculate a statistical measure such as the Z-score, as shown graphically in FIG. 9B for each grid location and each such predetermined time interval. Z-score may be defined as a ratio of the difference values with respect to the standard deviation of the difference values.

Figure 10:
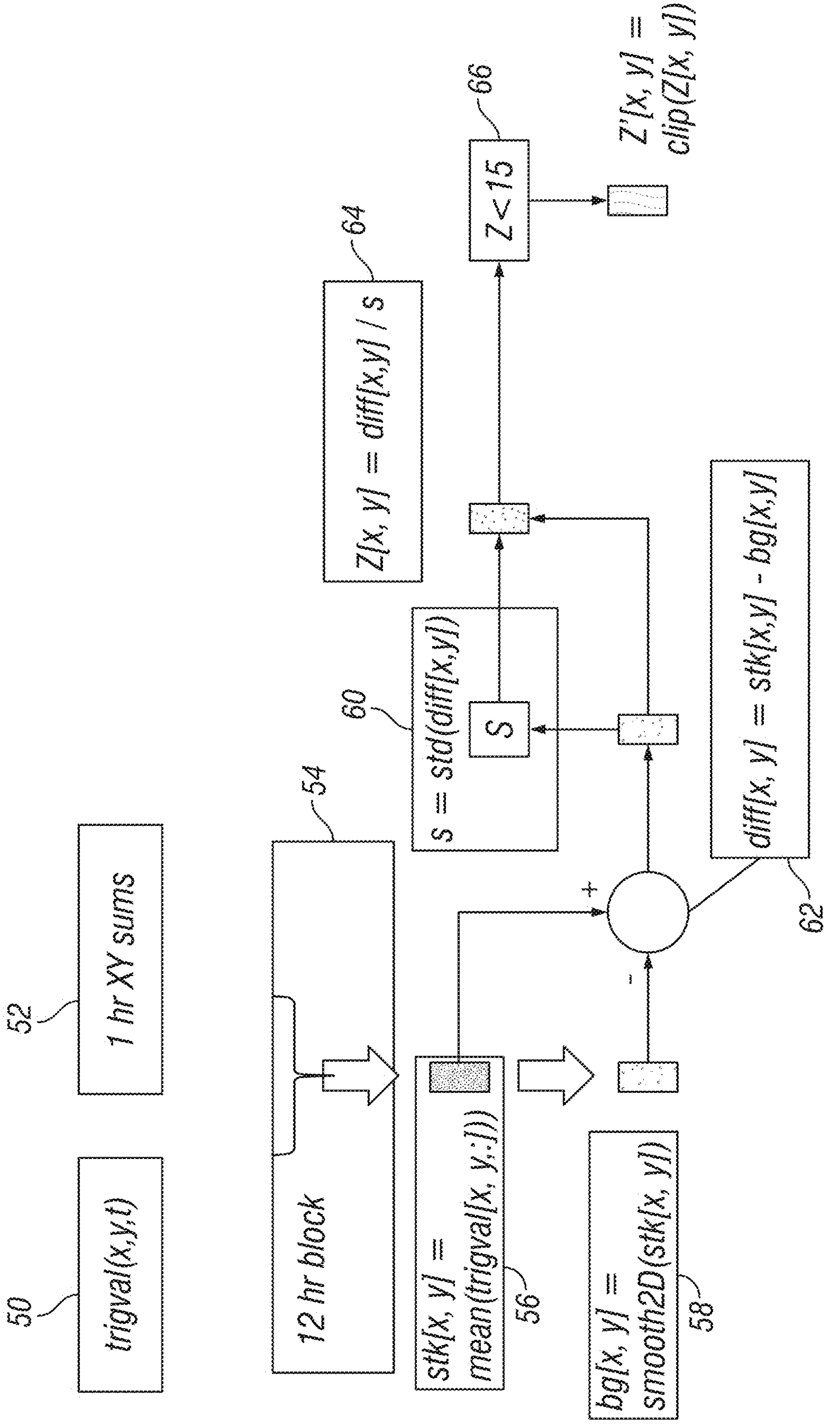
FIG. 10 shows a flow chart of calculations used to obtain the plots shown in FIGS. 7, 8 and 9.

A flow chart showing calculation of the Z-score may be observed in FIG. 10. At 50, amplitude values (within the beam steered sensor response) summed within a first time interval, at 52, that exceed a predetermined threshold are identified. At 54, the beam steered response is summed within a second, longer time interval centered on the same time samples as in the first time interval. At 54, a ratio of the amplitude values in each of the first time intervals with respect to the amplitude values in each of the second time intervals is calculated for each time sample value in any time part of or all of the recorded seismic signals. Any ratio value exceeding a predetermined amount or threshold is identified as an event trigger. At 56, STK values are calculated for each of a plurality of locations within a grid of locations inside the perimeter defined by the seismic sensor locations. At 58 a smoothed value of the STK values is calculated for each grid location. At 60, the difference between the smoothed STK values and the previously calculated STK values is determined for each grid location. And for each time interval selected. At 62, a statistical measure, e.g., standard deviation, of the difference values at each grid location is calculated. At 64, a value of Z score is calculated for each grid location. At 66, the Z scores exceeding a predetermined threshold are identified.

For purposes of identifying seismic events in the subsurface related to growth of the failure feature, calculated Z-scores above a predetermined threshold may be selected as advance indications of formation failure generating detectable seismic events in the subsurface.

Figure 11:
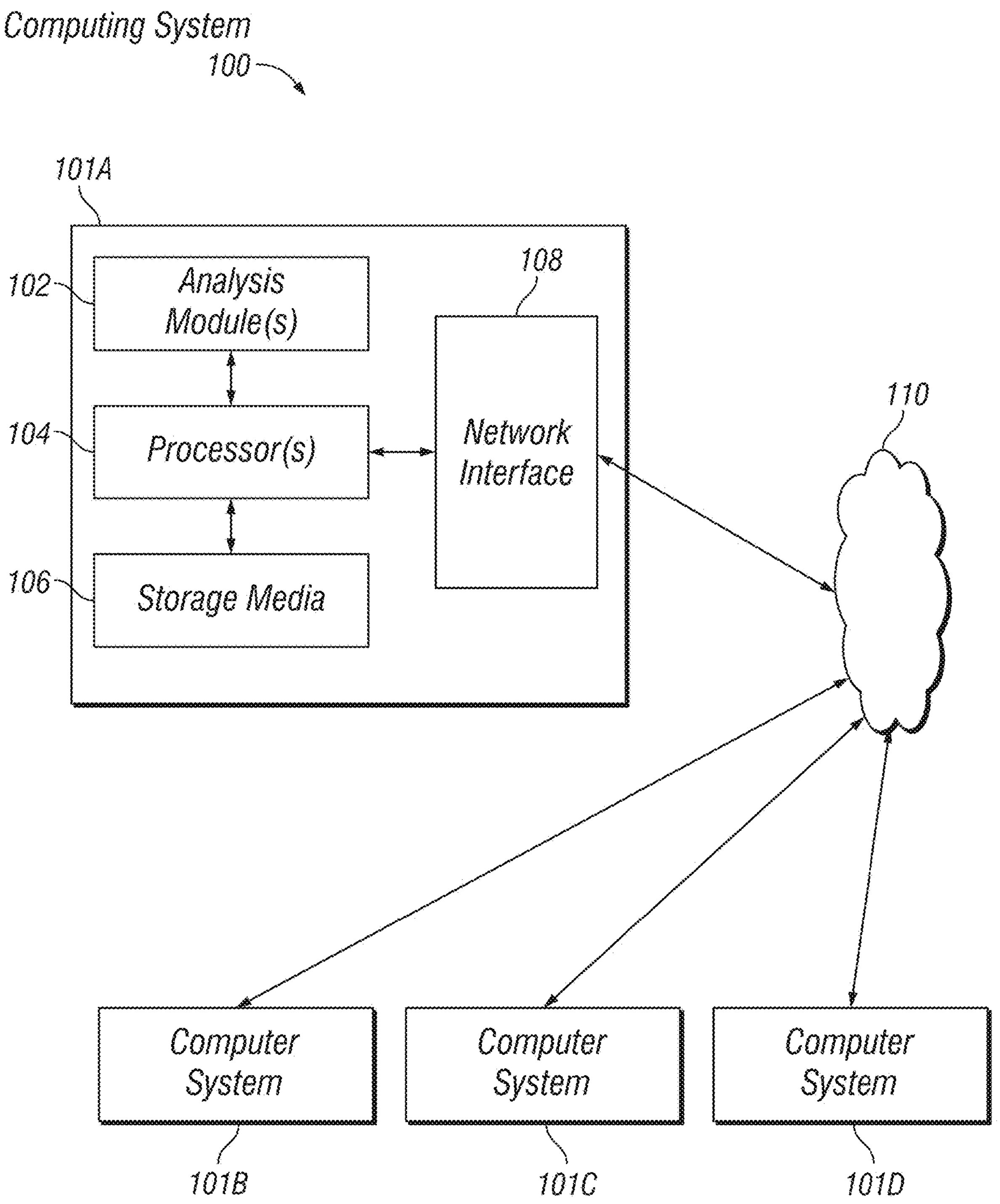
FIG. 11 shows an example computer system that may be used in some embodiments.

FIG. 11 shows an example computing system 100 in accordance with some embodiments to perform the data processing as explained with reference to FIGS. 8 through 10B. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIG. 11. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at surface facility or mine location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 11, and/or the computing system 100 may have a different configuration or arrangement of the components shown in FIG. 11. The various components shown in FIG. 11 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method for monitoring an area of Earth's subsurface for locating subsurface formation failure, comprising:

accepting as input to a computer recorded signals detected as passive seismic signals by a plurality of seismic sensors disposed proximate the area;

in the computer, migrating the recorded signals from each of the plurality of seismic sensors to each of a plurality of predetermined sub volumes within the area;

in the computer, summing the migrated response for each of the plurality of sub volumes over a first selected time interval;

in the computer, detecting, from the summed, migrated response, events having an amplitude exceeding by a predetermined amount an average amplitude over a second selected time interval longer than the first time interval;

in the computer, summing amplitudes of the detected events over a third time interval from within each of a plurality of predetermined substantially vertical columns of the plurality of sub volumes;

in the computer, calculating a smoothed value for the summed amplitudes over the third time interval using the calculated amplitudes for a predetermined number of preceding and succeeding third time intervals and for a predetermined number of grid positions adjacent to each of the plurality of substantially vertical columns;

in the computer, calculating a two dimensional smooth surface based on the smooth values;

in the computer, calculating a difference between the summed amplitudes and a value of the two dimensional smooth surface for each vertical column;

in the computer, calculating a statistical measure of each of the difference values;

identifying those of the statistical measures that exceed a selected threshold as indication of rock formation failure events occurring above a karst in the subsurface formation; and using the indication of rock formation failure above the karst to remediate the rock formation failure;

wherein the remediating comprises drilling a relief hole into the karst and inserting a sealing material into the relief hole.

2. The method of claim 1, wherein the detected seismic signals comprise at least one of particle motion signals, pressure signals and pressure time derivative signals.

3. The method of claim 1, wherein the statistical measure comprises Z score, the Z score comprising a ratio of the difference value with respect to a standard deviation of the difference values.

4. The method of claim 1, wherein the migrating is defined with respect to a horizontal grid of sub-areas within the area.

5. The method of claim 4, wherein the columns are each defined with respect to each sub-area.

6. The method of claim 1, wherein the migrating comprises adding a time delay to the each of recorded signals such that a seismic event originating in each sub volume would occur in each of the recorded signals at a same time.

7. The method of claim 6, wherein the time delay is calculated based on a spatial distribution of seismic velocity in the area and a location of each of the seismic sensors.

8. The method of claim 1, wherein the predetermined amount comprises a selected multiplier.

9. A non-transitory computer readable medium having stored thereon a computer program, the program having logic operable to cause a programmable computer to perform actions, comprising:

accepting as input to a computer recorded signals detected as passive seismic signals by a plurality of seismic sensors disposed proximate an area of Earth's subsurface;

migrating a response of the plurality of seismic sensors to each of a plurality of sub volumes within the area;

summing the migrated response for each of the plurality of sub volumes over a first selected time interval;

detecting, from the summed, migrated response, events having an amplitude exceeding by a predetermined amount an average amplitude over a second selected time interval longer than the first time interval;

summing amplitudes of the detected events over a third time interval from within each of a plurality of predetermined substantially vertical columns of the plurality of sub volumes;

calculating a smoothed value for the summed amplitudes over the third time interval using the calculated amplitudes for a specified number of preceding and succeeding time intervals;

calculating a two dimensional smooth surface based on the summed amplitudes;

calculating a difference between the summed amplitudes and a value of the two dimensional smooth surface for each vertical column;

calculating a statistical measure of each of the difference values;

identifying those of the statistical measures that exceed a selected threshold as indication of rock formation failure events occurring above a karst in the Earth's subsurface, the indication used to remediate the rock formation failure events wherein the remediation comprises drilling a relief hole into the karst and inserting a sealing material into the relief hole.

10. The non-transitory computer readable medium of claim 9, wherein the detected seismic signals comprise at least one of particle motion signals, pressure signals and pressure time derivative signals.

11. The non-transitory computer readable medium of claim 9, wherein the statistical measure comprises Z score, the Z score comprising a ratio of the difference value with respect to a standard deviation of the difference values.

12. The non-transitory computer readable medium of claim 9, wherein the migrating is defined with respect to a horizontal grid of sub-areas within the area.

13. The non-transitory computer readable medium of claim 12, wherein the columns are each defined with respect to each sub-area.

14. The non-transitory computer readable medium of claim 9, wherein the migrating comprises adding a time delay to the each of recorded signals such that a seismic event originating in each sub volume would occur in each of the recorded signals at a same time.

15. The non-transitory computer readable medium of claim 14, wherein the time delay is calculated based on a spatial distribution of seismic velocity in the area and a location of each of the seismic sensors.

16. The non-transitory computer readable medium of claim 9, wherein the predetermined amount comprises a selected multiplier.

* * * * *